(12) United States Patent
Simmons et al.

(10) Patent No.: US 9,174,410 B2
(45) Date of Patent: Nov. 3, 2015

(54) COMPOSITE MATERIALS

(75) Inventors: Martin Simmons, Baldock (GB); Michael Jeschke, Kendal (GB)

(73) Assignees: Hexcel Composites Limited, Cambridge (GB); Technical Fibre Products Limited, Kendal (GB)

( * ) Notice: Subject to any disclaimer, the term of this patent is extended or adjusted under 35 U.S.C. 154(b) by 603 days.

(21) Appl. No.: 13/120,058

(22) PCT Filed: Sep. 11, 2009

(86) PCT No.: PCT/GB2009/051170
§ 371 (c)(1),
(2), (4) Date: Mar. 21, 2011

(87) PCT Pub. No.: WO2010/035021
PCT Pub. Date: Apr. 1, 2010

(65) Prior Publication Data
US 2011/0174522 A1 Jul. 21, 2011

(30) Foreign Application Priority Data
Sep. 26, 2008 (GB) .................................. 0817591.1

(51) Int. Cl.
*B32B 27/04* (2006.01)
*B32B 27/12* (2006.01)
(Continued)

(52) U.S. Cl.
CPC ... *B32B 5/26* (2013.01); *B32B 5/28* (2013.01); *B32B 9/00* (2013.01); *B32B 27/02* (2013.01);
(Continued)

(58) Field of Classification Search
CPC ............. B32B 5/12; B32B 5/22; B32B 5/26; B32B 5/28; B32B 27/02; B32B 27/04; B32B 27/12; B32B 27/18; B32B 27/20; B32B 27/34; B32B 27/36; C08J 5/24; Y10T 428/27; Y10T 428/24124; Y10T 428/2929; Y10T 428/2931; Y10T 428/2973; D01F 8/00–8/18
USPC ........... 428/292.1–301.4, 141, 143, 148, 219, 428/221, 297.4, 297.7, 299.1, 300.7, 340, 428/411.1–442, 457, 472, 473.5, 483, 688, 428/680, 697, 698, 922, 373, 374; 442/1, 6, 442/50, 52, 110, 117; 361/212, 216, 217, 361/218
See application file for complete search history.

(56) References Cited

U.S. PATENT DOCUMENTS 3,989,984 A  11/1976 Amason et al.
4,352,142 A   9/1982 Olson
(Continued)

FOREIGN PATENT DOCUMENTS

EP  0274899  7/1988
EP  0522663  1/1993
(Continued)

OTHER PUBLICATIONS

Hexcel Corporation, Technical FAbrics Handbook, Dec. 2010, pp. 82-83.*
Chang, Karl, Aramid Fibers, 2001, ASM Handbook vol. 21, pp. 41-45.*
Engineered Fibers Technology, Kuraray Specialty Fibers, 2010, acessed Dec. 11, 2013, <www.eftfibers.com/prod_k-spec.php>.*

*Primary Examiner* — Jennifer Chriss
*Assistant Examiner* — Frank Vineis
(74) *Attorney, Agent, or Firm* — W. Mark Bielawski; David J. Oldenkamp

(57) ABSTRACT

A prepreg comprising resin and at least one fiber layer and further comprising an electrically insulating layer and an electrically conducting layer is provided, and particularly wherein the conductive layer is at or near the top surface, beneath that is the insulating layer and beneath that is a fiber/resin interleaf structure.

12 Claims, 6 Drawing Sheets

(51) Int. Cl.

| | | |
|---|---|---|
| *D04H 3/004* | (2012.01) | |
| *B32B 5/26* | (2006.01) | |
| *D01F 8/12* | (2006.01) | |
| *D01F 8/14* | (2006.01) | |
| *D04H 3/147* | (2012.01) | |
| *B32B 5/28* | (2006.01) | |
| *B32B 9/00* | (2006.01) | |
| *B32B 27/02* | (2006.01) | |
| *B32B 27/20* | (2006.01) | |
| *B32B 27/34* | (2006.01) | |
| *B32B 27/36* | (2006.01) | |
| *C08J 5/24* | (2006.01) | |
| *H05F 1/00* | (2006.01) | |
| *B60C 19/08* | (2006.01) | |
| *H01B 3/48* | (2006.01) | |

(52) U.S. Cl.
CPC ............... *B32B 27/04* (2013.01); *B32B 27/12* (2013.01); *B32B 27/20* (2013.01); *B32B 27/34* (2013.01); *B32B 27/36* (2013.01); *C08J 5/24* (2013.01); *D01F 8/12* (2013.01); *D01F 8/14* (2013.01); *D04H 3/147* (2013.01)

(56) References Cited

U.S. PATENT DOCUMENTS

| | | | |
|---|---|---|---|
| 4,479,163 A | | 10/1984 | Bannink et al. |
| 4,522,889 A | * | 6/1985 | Ebneth et al. .................. 428/614 |
| 5,352,565 A | * | 10/1994 | Schroeder ..................... 430/320 |
| 5,370,921 A | | 12/1994 | Cedarleaf |
| 5,417,385 A | | 5/1995 | Arnold et al. |
| 6,679,667 B2 | | 1/2004 | Brown et al. |
| 2006/0292375 A1 | | 12/2006 | Martin |
| 2007/0141927 A1 | | 6/2007 | Brown |

FOREIGN PATENT DOCUMENTS

| | | |
|---|---|---|
| EP | 1473227 A2 | 11/2004 |
| EP | 1767344 A2 | 9/2006 |
| EP | 2053078 | 4/2009 |
| GB | 2433467 A | 6/2007 |
| JP | 2006-219078 | 8/2006 |
| WO | 2007123700 | 11/2007 |
| WO | 2007127032 | 11/2007 |
| WO | 2008056123 | 5/2008 |
| WO | 2009128991 | 10/2009 |

* cited by examiner

US 9,174,410 B2

COMPOSITE MATERIALS

TECHNICAL FIELD

The present invention relates to improvements in the electromagnetic response of composite materials, particularly to providing improved resistance to damage caused by lightning strikes.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

A common composite material is made up from a laminate of a plurality of prepreg fibre layers, e.g. carbon fibres, interleafed with resin layers. Although the carbon fibres have some electrical conductivity, the presence of the interleaf layers means that this is only exhibited in the composite in the plane of the laminate. The electrical conductivity in the direction orthogonal to the surface of the laminate, the so-called z-direction, is low.

This lack of conductivity in the z-direction is generally accepted to contribute to the vulnerability of composite laminates to electromagnetic hazards such as lightning strikes. A lightning strike can cause damage to the composite material which can be quite extensive, and could be catastrophic if occurring on an aircraft structure in flight. This is therefore a particular problem for aerospace structures made from such composite materials.

A wide range of techniques and methods have been suggested in the prior art to provide lightning strike protection to such composite materials, typically involving the addition of conductive elements at the expense of increasing the weight of the composite material.

WO 2007/123700 discloses a composite material having applied thereon a dielectric ply and a conductive ply at regions of the composite material where it is fastened to a structure beneath by conducting fasteners. This approach is limited to application in selected regions of a structure in view of the additional weight involved.

In WO 2008/056123 significant improvements have been made in lightning strike resistance, without significantly increasing weight, by adding hollow conductive particles in the resin interleaf layers so that they contact the adjacent fibre layers and create an electrical pathway in the z-direction.

It would therefore appear from the prior art that such conductive composites provide good lightning strike resistance which can be applied over an extended region of a structure without significant increase in weight. However, it has been found that the approach of increasing the conductivity of the composite may be flawed for aerospace applications, where it is needed most.

SUMMARY OF INVENTION

The invention is based on the surprising discovery that when such conductive composite materials, as described above, are painted with a coating qualified for aerospace usage, all of the lightning strike resistance provided by the conductivity is lost and even may be more susceptible to lightning strike damage than a conventional unpainted non-conducting composite known in the art.

It is believed that this may be because such paints are typically electrically insulating which prevents the conductive nature of the underlying composite material from dissipating the lightning strike energy quickly enough to prevent damage occurring. As such paints will almost always be applied in aerospace applications, the problem of providing lightning strike protection has been found to need a re-evaluation.

In a first aspect the present invention relates to a curable prepreg comprising resin and at least one fibre layer and further comprising an electrically insulating layer and an electrically conducting layer.

By including both an electrically insulating and an electrically conducting layer in the prepreg the lightning strike resistance of the prepreg following curing and painting with an insulating aerospace paint is significantly increased, without necessarily involving a significant weight increase.

Thus, in a second aspect the invention relates to a prepreg according to the invention which has been cured to produce a composite laminate, and to such a cured composite laminate painted on at least one side with electrically insulating aerospace paint.

In a third aspect, the invention relates to an aerospace structure comprising a plurality of cured composite laminates according to the invention.

The invention applies to a wide range of prepreg resin and fibre arrangements and is particularly suited to the well-known interleaf structure, whereby layers of fibres impregnated with resin are interleafed with layers of resin. Preferably the prepreg comprises a laminate of such fibre and resin layers, e.g. from 4 to 10 fibre layers with a corresponding number of resin layers. Suitable interleaf structures are disclosed in EP 0274899.

Thus, the term "prepreg" encompasses a curable laminate of fibre reinforced resin layers, and can include other materials whilst remaining a prepreg until it is cured.

In a preferred arrangement the prepreg comprises the electrically conducting layer at or near the top surface, the electrically insulating layer beneath and a fibre/resin interleaf structure beneath that, as described above. Once cured and ready for use in an aerospace application, the cured laminate is intended to be painted on the uppermost layer.

It is believed that this arrangement is particularly resistant to lightning strike because it contains an upper electrically insulating layer (the aerospace paint) then an electrically conducting layer, followed by an electrically insulating layer. It is believed that this structure of alternating conducting and insulating layers provides lightning strike protection without the need for increasing conductivity in the z-direction.

Surprisingly it has been found that this effect can be achieved even though the electrically conductive layer and the electrically insulating layer are extremely thin, enabling the prepregs according to the invention to be lightweight and themselves no appreciably thicker than prior art prepregs. Thus, the prepregs according to the invention can be typically from 0.5 to 5.0 mm in thickness, preferably from 0.5 to 3.0 mm. This may be achieved with a conducting layer having a thickness of from 0.05 to 0.5 mm and an electrically insulating layer having a thickness of from 0.05 to 0.5 mm.

In one embodiment, the curable prepreg according to the invention comprises a single layer of fibre material. The single layer prepreg may then be combined, e.g. by placing on top of, other prepregs not according to the invention to produce a prepreg stack. Such a single layer prepreg according to the invention is typically provided on releasable backing paper and typically on a roll, preferably with a thickness of from 0.5 to 3.0 mm, preferably from 0.5 to 2.0 mm.

A typical aerospace paint involves the application of three layers, an epoxy primer layer, a second coat of epoxy, and a third coat based on polyurethane.

When the prepreg has an interleaf structure, preferably the resin layers comprise toughening particles, e.g. based on nylon or other thermoplastic materials and 10 to 50 microns in diameter, to provide good impact resistance and to help produce the interleaf (resin) layer.

The fibres in the fibre layers may be uni-directional, fabric form or multi-axial. Preferably the fibres are uni-directional and their orientation will vary throughout the prepreg stack and/or laminate, for example by arranging for the fibres in neighbouring layers to be orthogonal to each other in a so-called 0/90 arrangement, signifying the angles between neighbouring fibre layers. Other arrangements such as 0/+45/−45/90 are of course possible among many other arrangements.

The fibres may comprise cracked (i.e. stretch-broken), selectively discontinuous or continuous fibres.

The conductive fibres may be made from a wide variety of materials such as metallised glass, carbon, graphite, metallised polymers and mixtures thereof. Carbon fibres are preferred.

The resin in the prepreg is typically a thermosetting resin. The thermosetting resin may be selected from those conventionally known in the art, such as resins of phenol-formaldehyde, urea-formaldehyde, 1,3,5-triazine-2,4,6-triamine (melamine), bismaleimide, epoxy resins, vinyl ester resins, benzoxazine resins, polyesters, unsaturated polyesters, cyanate ester resins, or mixtures thereof.

Particularly preferred are epoxy resins, for example mono functional, difunctional or trifunctional or tetrafunctional epoxy resins. Preferred difunctional epoxy resins include diglycidyl ether of Bisphenol F (e.g. Araldite GY 281), diglycidyl ether of Bisphenol A, diglycidyl dihydroxy napthalene and mixtures thereof. A highly preferred epoxy resin is a trifunctional epoxy resin having at least one meta-substituted phenyl ring in its backbone, e.g. Araldite MY 0600. A preferred tetrafunctional epoxy resin is tetraglycidyl diamino diphenylmethane (e.g. Araldite MY721) A blend of di- and tri functional epoxy resins is also highly preferred.

The thermosetting resin may also comprise one or more curing agent. Suitable curing agents include anhydrides, particularly poly carboxylic anhydrides; amines, particularly aromatic amines e.g. 1,3-diaminobenzene, 4,4'-diamino-diphenylmethane, and particularly the sulphones, e.g. 4,4'-diaminodiphenyl sulphone (4,4' DDS), and 3,3'-diaminodiphenyl sulphone (3,3' DDS), and the phenol-formaldehyde resins. Preferred curing agents are the amino sulphones, particularly 4,4' DDS and 3,3' DDS.

The type and design of the resin and fibres may be any suitable known materials, such as those mentioned in WO 2008/056123.

The electrically conductive layer is preferably a permeable layer (e.g. a veil, a fabric or unidirectional fibre) in order to minimise weight. Surprisingly this permeability does not affect the ability of the layer to confer lightning strike protection. When permeable, resin may enter the pores of the conducting layer prior to curing with no detrimental effects to the subsequent lightning strike performance.

Preferably the electrically conducting layer comprises conductive (i.e. metal coated) fibres, e.g. metal coated glass fibres or metal coated carbon fibres. Metal coated carbon fibres are preferred. A currently preferred conductive layer is a copper and nickel coated carbon fibre veil. The conducting layer preferably has a weight per unit area of from 5 to 100 grams per square meter (gsm) preferably from 5 to 50 gsm.

The electrically insulating layer is also preferably a permeable layer e.g. a non woven fabric, again in order to minimise weight. As for the conductive layer, it is surprising that this does not affect its ability to confer lightning strike resistance, provided that it remains capable of preventing contact between any conductive layers on either side of the insulating layer.

The material for the insulating layer of the prepreg can be any suitable electrically insulating material, such as for example glass fibre materials such as fabrics or veils or insulating polymer materials. It is therefore preferably a solid material. The insulating layer preferably has a weight per unit area of from 5 to 50 gsm preferably from 5 to 30 gsm.

In order to provide a good surface finish, it is preferable that the prepreg comprises a resin layer as its uppermost layer. This region can be the same or different to that used in the fibre/resin interleaf structure. It can be based on any suitable thermoset material such as vinyl esters or polyimides.

Therefore, in a preferred embodiment the prepreg comprises an uppermost resin layer, beneath that the electrically conductive (e.g. porous) layer, beneath that the electrically insulating (e.g. porous) layer and beneath that a fibre/resin interleaf structure as described above.

Thus it is preferred that the electrically conductive layer and the electrically insulating layer are embedded into the resin. In view of the fact that these layers can provide lightning strike resistance even whilst permeable, thin and lightweight, this enables the prepregs of the invention to be used across large areas of aerospace components without significant weight increase.

It has been found that further improvements in lightning strike resistance may be achieved when the prepreg comprises an interleaf structure and is made more conductive, e.g. by the resin interleaf layers comprising conductive particles.

The conductive particles can be any particles that are electrically conductive, such as carbon particles. Preferably they are metal coated hollow glass spheres. A silver coating has been found to be effective.

In order to create a conductive pathway in the z-direction, the conductive particles should be of a size such that they contact the fibre plies on each side of the resin ply. Thus at least 50% of the conducting particles have a size within 10 microns, preferably within 5 microns, of the thickness of the resin layer they are in. A suitable mean diameter for the conductive particles is from 10 to 30 microns, preferably from 15 to 25 microns.

It has been found that a volume density of conductive particles in a resin layer of from 0.2 vol % to 20 vol % of the prepreg gives good results. Preferably the conductive particles are present at from 0.4 vol % to 15 vol %, more preferably from 0.8 vol % to 10.0 vol %.

The invention will now be illustrated, by way of example, and with reference to the following figures in which.

Figure 1:
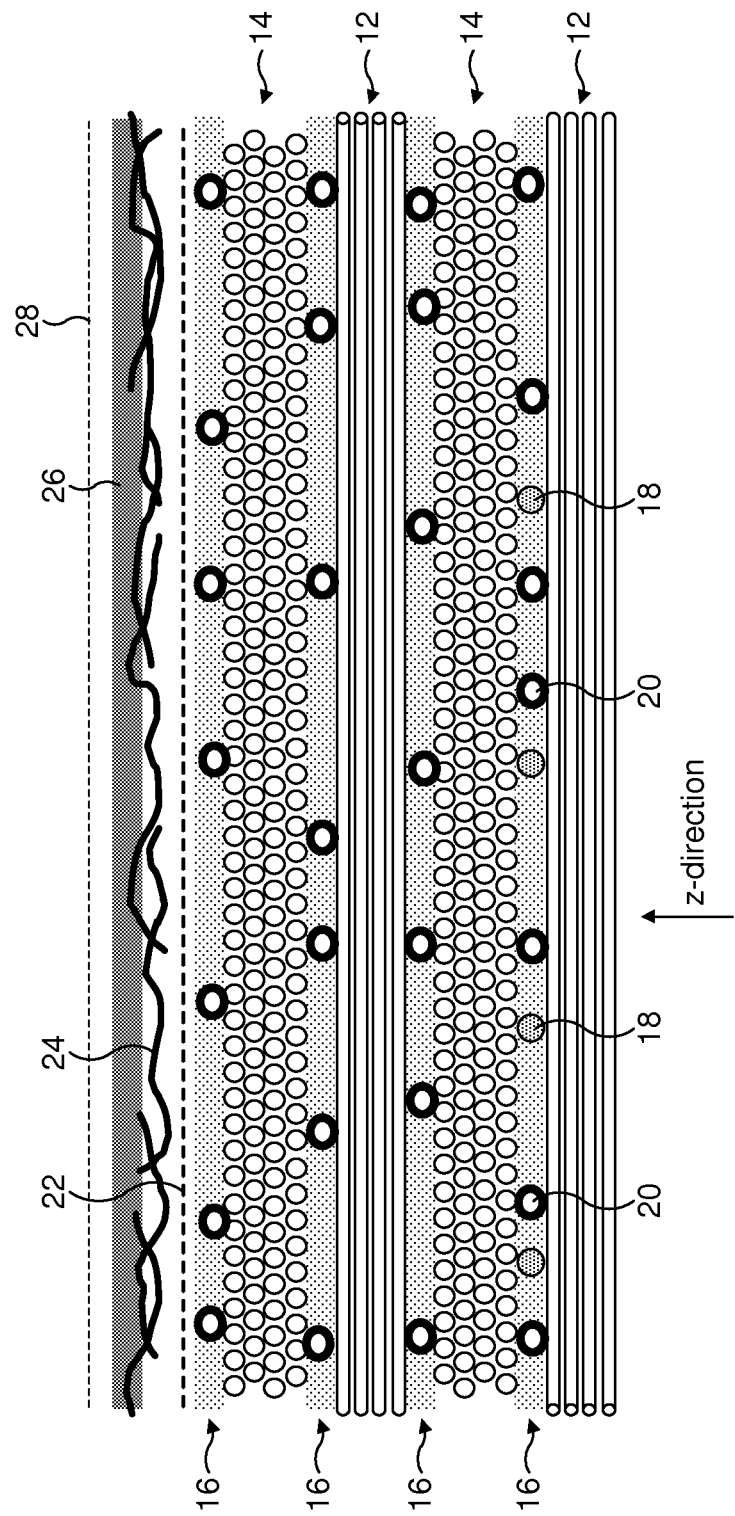
FIG. 1 is a schematic view of a section through a prepreg according to the invention.

With reference to FIG. 1, a schematic of a prepreg 10 according to the invention is shown. The prepreg 10 comprises carbon fibre layers 12 with their fibres running across the direction of the page and fibre layers 14 with their fibres running into the page. Thus the direction of the fibres alternates between layers so that they are orthogonal to neighbouring layers, in what is known as a 0/90 arrangement.

Each fibre layer 12, 14 is separated by a resin interleaf layer 16 with a thickness of about 25 microns. Contained within the resin layers 16 are nylon toughener particles 18 (shown in only one layer but would be present in all resin layers) and electrically conductive particles 20. It can be seen that the conductive particles contact adjacent fibre plies and create an electrical pathway in the z-direction. The conductive particles are silver-coated hollow glass spheres of diameter about 25 microns.

Above the fibre and resin layers is a porous insulating polymer layer 22 which can be for example a non-woven structure of Wramp™ fibre which is a bi-component fibre comprising a stacked structure of eleven alternating layers of polyester and nylon where the bi-component fibres are 65% polyester and 35% nylon, and available from Technical Fibre Products of Kendal, England or a porous polyester layer made from poly(ethylene terephthalate) also available from Technical Fibre Products.

Directly above the insulating layer 22 is a porous electrical conducting layer 24 which can be for example a copper and nickel coated carbon fibre veil such as is available from Technical Fibre Products of Kendal, England.

Directly above the conducting layer 24 is top resin layer 26, which may be the same as the resin used in layers 16 and it may be different.

The prepreg is prepared in known manner with the laying down of successive layers. As the electrically insulating layer 22 and the electrically conductive layer 24 are permeable, resin from the top layer 26 and from layers 16 can enter the pores during lay-up. Alternatively the conducting layer and/or the insulating layer may be impregnated with resin before addition to the prepreg. The resulting prepreg is flexible, drapable and has good tack whilst also being curable to form a lightning strike resistant composite laminate.

Following cure, for many applications including those in aircraft manufacture, the top surface of the cured composite is coated with a paint layer 28 e.g. with a three layer system comprising an epoxy primer layer, a second coat of epoxy and a third coat based on polyurethane. The paint is an electrical insulator and the thickness can vary.

EXAMPLES

A roll of prepreg was made by prepregging resin onto 600 mm×600 mm unidirectional IM7 carbon fibre (Hexcel) to produce a prepreg with 35 wt % of resin. A separate roll of prepreg was made in the same manner but with the addition of 3.5 wt % of 25-30 micron diameter silver coated glass hollow beads. Areal weight of both types of prepreg was 194 gsm. The resin used is as used in batches 1349 and 1351 of WO 2008/040963.

The prepregs were then laid up by using six plies of prepreg (600×600 mm) of the same type in a 0/90 arrangement. In this manner laminates of fibre and resin either with or without conductive particles were made.

To improve the conductivity of the prepregs a porous electrically conductive layer, e.g. a copper-nickel coated carbon veil, supplied by Technical Fibre Products, Kendal, England, was first impregnated with resin (at 25 gsm) and added to the top layer of the laid up prepreg.

When the prepregs are to comprise a permeable insulating layer then this is simply placed between the conducting layer and the fibre/resin laminate.

Resulting laminates were cured using a standard aerospace autoclave cure cycle of 177° C. for 2 hours at 7 bar pressure and then cut to 500 mm×500 mm.

The cured laminates were coated on their top surface with a paint qualified for aerospace use (Akzo Nobel, Sassenheim, The Netherlands). The paint comprises a primer, second layer and top urethane layer, as described above.

The painted panels were tested at Culham Lighting, Oxford, using a controlled lightning strike test, ensuring that the lightning struck the painted side. Each lightning strike involved a peak current of from 188 to 195 kA, to ensure consistency in the results.

The results for a variety of panels made according to the above procedure are shown below in Table 1. Composite laminates according to the invention are shown as panels 1 to 5. Comparative laminates are shown as panels A to C.

TABLE 1

| Panel Ref | Conductive Layer (gsm) | Insulating Layer (gsm) | Conductive particles | Total Charge Transfer (Coulombs) | C-Scan damage area (cm$^2$) | Panel Damage (1-5)$^\#$ |
|---|---|---|---|---|---|---|
| A (FIG. 2) | None | — | Yes | 36.5 | * | 1 |
| B (FIG. 3) | Cu—Ni—C (34) | — | Yes | 28.6 | * | 1 |

TABLE 1-continued

Figure 5A:
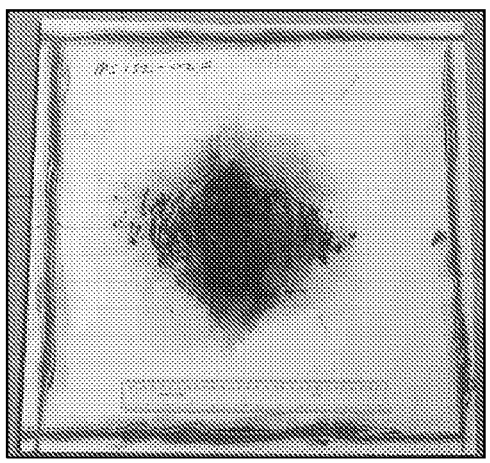
FIGS. 5a and 5b show photographs of the upper (FIG. 5a) and lower (FIG. 5b) sides of a composite laminate according to the invention following a controlled lightning strike on the upper side.
Figure 5B:
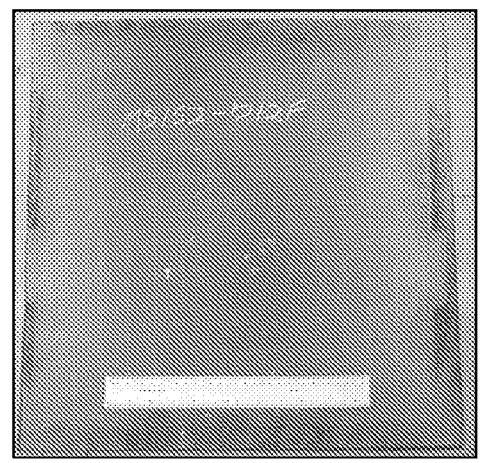
Figure 6A:
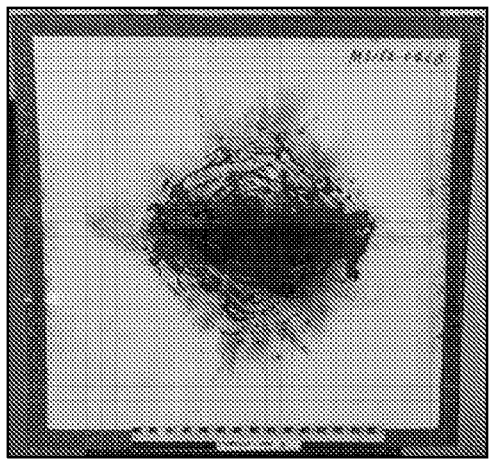
FIGS. 6a and 6b show photographs of the upper (FIG. 6a) and lower (FIG. 6b) sides of a composite laminate according to the invention following a controlled lightning strike on the upper side.
Figure 6B:
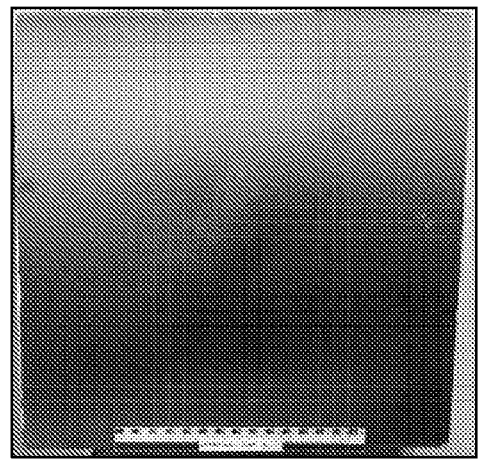
Figure 7A:
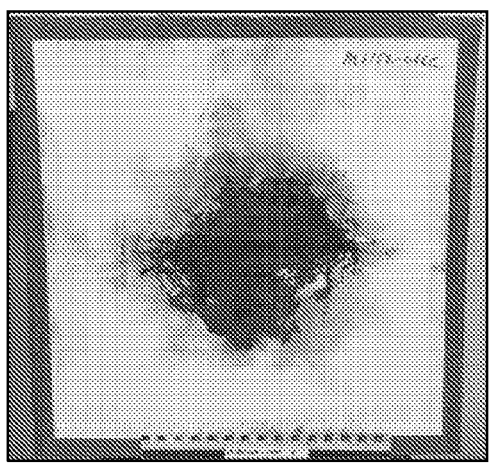
FIGS. 7a and 7b show photographs of the upper (FIG. 7a) and lower (FIG. 7b) sides of a composite laminate according to the invention following a controlled lightning strike on the upper side.
Figure 7B:
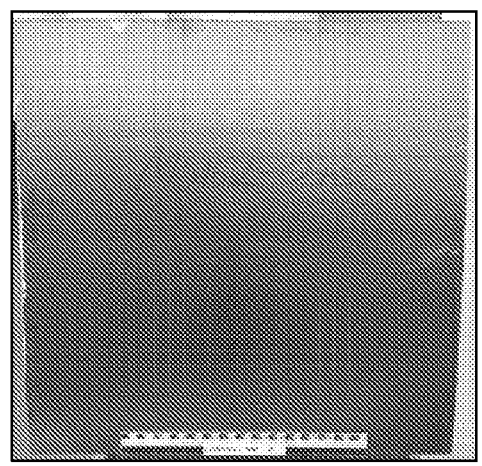
Figure 8A:
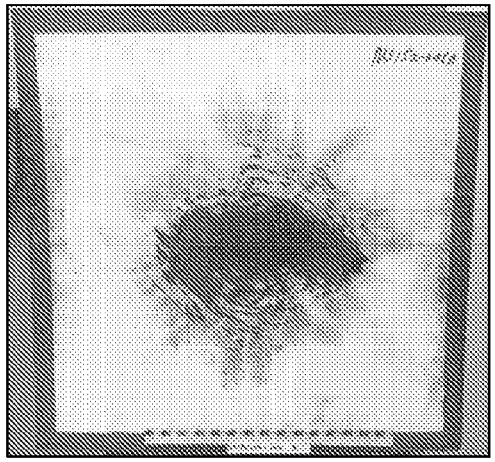
FIGS. 8a and 8b show photographs of the upper (FIG. 8a) and lower (FIG. 8b) sides of a composite laminate according to the invention following a controlled lightning strike on the upper side.
Figure 8B:
Figure 9A:
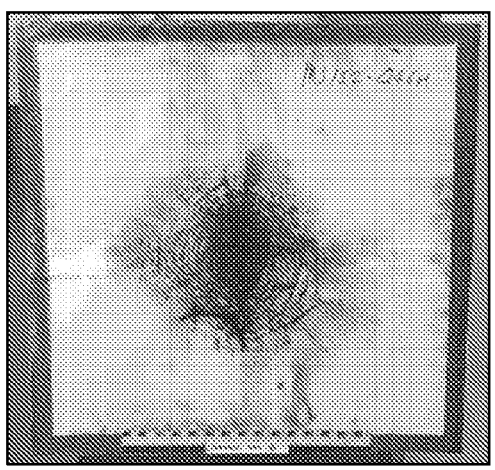
FIGS. 9a and 9b show photographs of the upper (FIG. 9a) and lower (FIG. 9b) sides of a composite laminate according to the invention following a controlled lightning strike on the upper side.
Figure 9B:
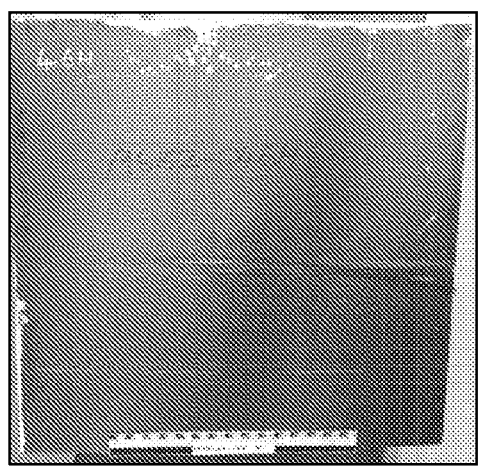
Figure 10A:
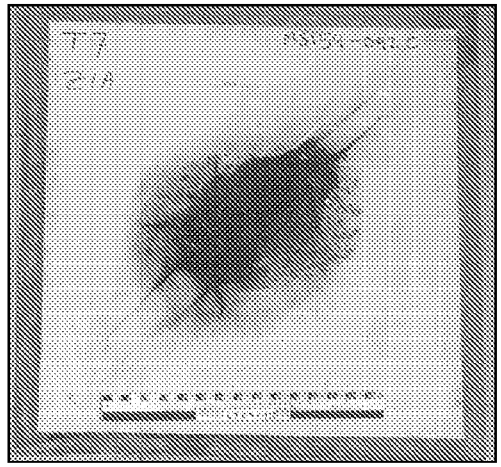
FIGS. 10a and 10b show photographs of the upper (FIG. 10a) and lower (FIG. 10b) sides of a composite laminate according to the invention following a controlled lightning strike on the upper side.
Figure 10B:
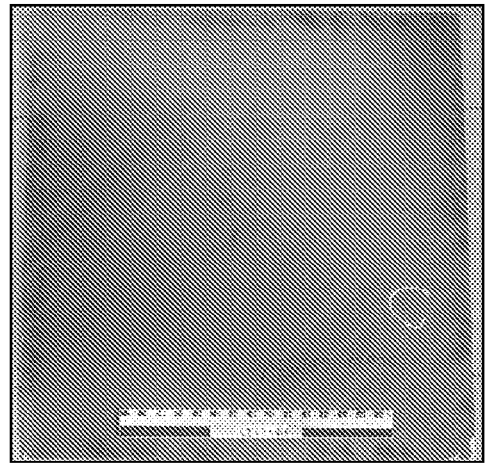
Figure 11A:
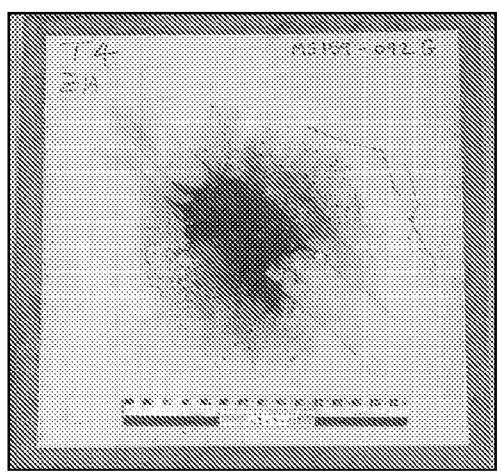
FIGS. 11a and 11b show photographs of the upper (FIG. 11a) and lower (FIG. 11b) sides of a composite laminate according to the invention following a controlled lightning strike on the upper side.
Figure 11B:
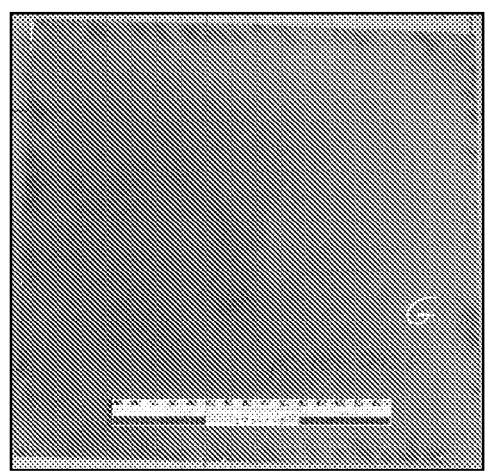

| Panel Ref | Conductive Layer (gsm) | Insulating Layer (gsm) | Conductive particles | Total Charge Transfer (Coulombs) | C-Scan damage area (cm²) | Panel Damage (1-5)# |
|---|---|---|---|---|---|---|
| C (FIG. 4) | Cu—Ni—C (34) | — | No | 31.5 | * | 2 |
| 1 (FIG. 5) | Cu—Ni—C (34) | WRAMP (11) | Yes | 25.7 | 330.5 | 4 |
| 2 (FIG. 6) | Cu—Ni—C (34) | WRAMP (11) | No | 27.7 | 361.6 | 3 |
| 3 (FIG. 7) | Cu—Ni—C (34) | WRAMP (11) | Yes | 28.8 | 325.6 | 4 |
| 4 (FIG. 8) | Cu—Ni—C (50) | WRAMP (11)) | No | 31.1 | 362.9 | 3 |
| 5 (FIG. 9) | Cu—Ni—C (34) | Glass veil (10) | No | 29.4 | 381.3 | 3 |
| 6 (FIG. 10) | Cu—Ni—C (34) | Polyester (12) | Yes | 27.6 | 410.6 | 3 |
| 7 (FIG. 11) | Cu—Ni—C (34) | Glass veil (35) | Yes | 35.7 | 381.3 | 3 |

1 = panel severely damaged, all plies delaminated and large whole in panel caused by blast and fire
2 = panel badly damaged, all plies delaminated, splitting to back face
3 = panel damaged, most plies delaminated, slight warping to back face
4 = panel slightly damaged, top plies delaminated, no damage to back face
5 = panel little damaged, top surface only scorched, only top ply delaminated
* = Panel too damaged for c-scan After the lightning strike, the damage was assessed visually and also quantitatively by use of an ultrasonic c-scan performed using an RID Tech Omniscan MX from Olympus.

Figure 2A:
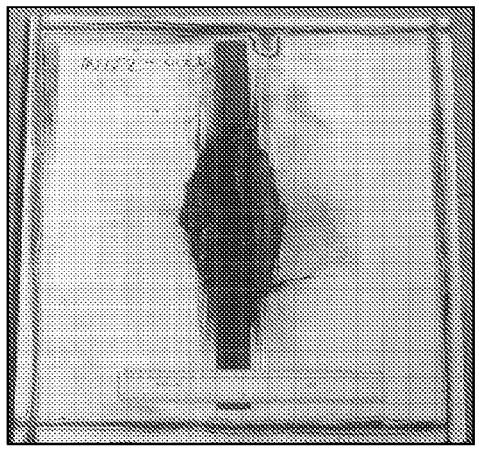
FIGS. 2a and 2b show photographs of the upper (FIG. 2a) and lower (FIG. 2b) sides of a prior art composite laminate following a controlled lightning strike on the upper side.
Figure 2B:
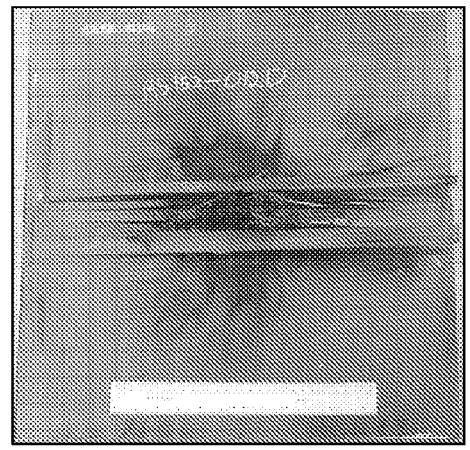
Figure 3A:
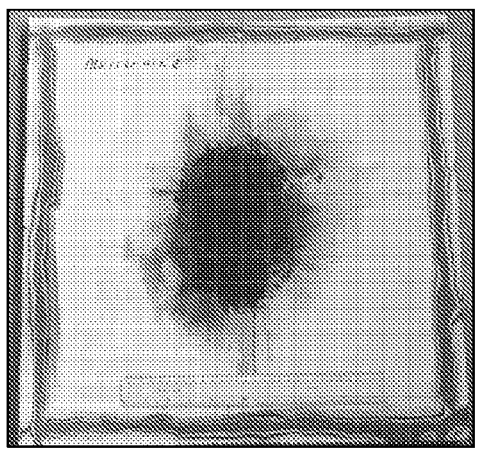
FIGS. 3a and 3b show photographs of the upper (FIG. 3a) and lower (FIG. 3b) sides of a prior art composite laminate following a controlled lightning strike on the upper side.
Figure 3B:
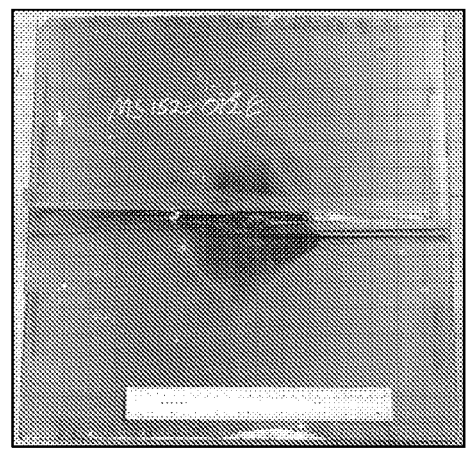
Figure 4A:
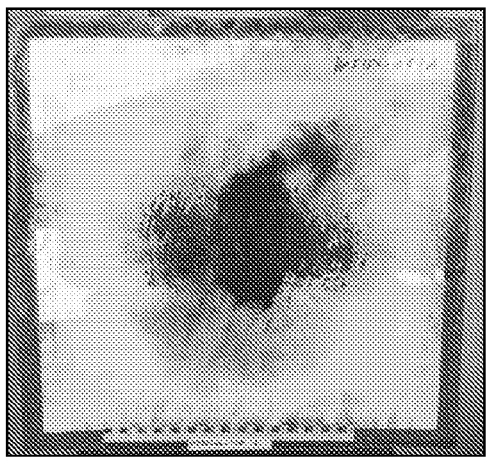
FIGS. 4a and 4b show photographs of the upper (FIG. 4a) and lower (FIG. 4b) sides of a prior art composite laminate following a controlled lightning strike on the upper side.
Figure 4B:
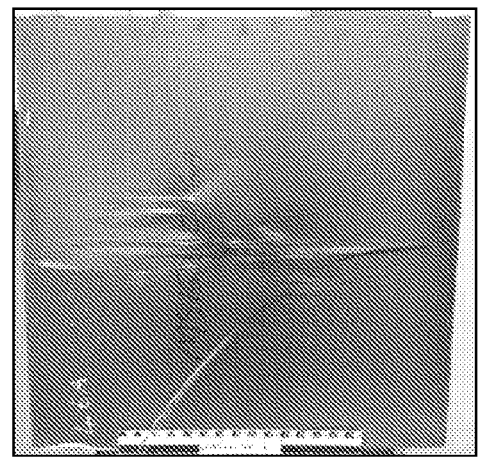

FIGS. 2 to 4 show how, when the panels are painted with an electrically insulating aerospace paint, the results are catastrophic even when conductive particles and a conductive layer are included.

FIGS. 5 to 11 show how a dramatic improvement in lightning strike resistance can be achieved when an insulating layer is included together with a conducting layer. Further improvements can be seen when this is combined with conducting particles.

The invention claimed is:

1. A curable prepreg comprising:
a fibre/resin structure comprising two layers of fibres between which is located a layer of uncured resin, said uncured resin comprising electrically conductive particles which are present in an amount of from 0.2 to 20 volume percent of said prepreg and wherein said electrically conductive particles have a particle size of from 10 to 30 microns;
an electrically conductive layer comprising a veil of metal coated fibres, said electrically conductive layer having a weight per unit area of from 5 to 50 grams per square meter; and
an electrically insulating layer located between said electrically conductive layer and said fibre/resin structure, said electrically insulating layer comprising a non-woven structure made from bi-component fibres said bi-component fibres comprising a stacked structure of eleven alternating layers of polyester and nylon where the bi-component fibres are 65% polyester and 35% nylon, said electrically insulating layer having a weight per unit area of from 5 to 30 grams per square meter.

2. A curable prepreg according to claim 1 wherein said electrically conducting layer comprises metal coated carbon fibres.

3. A curable prepreg according to claim 2 wherein said veil of metal coated fibres is a veil of carbon fibres coated with nickel and copper.

4. A curable prepreg according to claim 1 wherein said electrically conductive particles have a particle size such that a single electrically conductive particle contacts the layers of fibres located on each side of said layer of uncured resin.

5. A curable prepreg according to claim 1 wherein said electrically conductive particles are metal coated glass hollow beads.

6. A curable prepreg according to claim 1 wherein said uncured resin comprises an epoxy resin.

7. A curable prepreg according to claim 6 wherein said uncured resin comprises thermoplastic particles having diameters of from 10 to 50 microns.

8. A curable prepreg according to claim 1 wherein the particle size of said electrically conductive particles is from 15 to 25 microns.

9. A curable prepreg according to claim 1 wherein said conductive particles are present in an amount of from 0.4 to 15 volume percent of said prepreg.

10. A curable prepreg according to claim 1 wherein said conductive particles are present in an amount of from 0.8 to 10 volume percent of said prepreg.

11. A curable prepreg according to claim 8 wherein said conductive particles are present in an amount of from 0.4 to 15 volume percent of said prepreg.

12. A curable prepreg according to claim 8 wherein said conductive particles are present in an amount of from 0.8 to 10 volume percent of said prepreg.

* * * * *